United States Patent [19]

Heifetz

[11] 3,840,018

[45] Oct. 8, 1974

[54] CLAMP FOR OCCLUDING TUBULAR CONDUITS IN THE HUMAN BODY

[76] Inventor: Milton D. Heifetz, 704 N. Bedford Dr., Beverly Hills, Calif. 90210

[22] Filed: Jan. 31, 1973

[21] Appl. No.: 328,444

[52] U.S. Cl.................... 128/346, 24/274, 24/16, 128/92 R, 128/334 R
[51] Int. Cl..................... A61b 17/08, A61b 17/12
[58] Field of Search........ 128/325, 346, 327, 334 R, 128/92 R; 24/73 HS, 274 R, 243 B, 16 PB

[56] References Cited
UNITED STATES PATENTS

| | | | |
|---|---|---|---|
| 2,396,877 | 3/1946 | Peterson | 24/243 B |
| 2,607,092 | 8/1952 | Rubly | 24/274 R |
| 2,689,998 | 9/1954 | O'Shei | 24/274 R |
| 2,825,113 | 3/1958 | Schaefer | 24/274 R |
| 3,087,220 | 4/1963 | Tinsley | 24/274 R |
| 3,099,054 | 7/1963 | Spiro | 24/16 PB |
| 3,141,209 | 7/1964 | VanBuren, Jr. | 24/73 HS |
| 3,147,523 | 9/1964 | Logan | 24/16 PB |
| 3,273,441 | 9/1966 | Biesecker | 24/73 HS |
| 3,357,432 | 12/1967 | Sparks | 128/334 |
| 3,405,432 | 10/1968 | Scaravelli | 24/274 R |
| 3,477,429 | 11/1969 | Sampson | 128/346 |

OTHER PUBLICATIONS

Kindt Artery Clamp — Page 2, Lines 11–13 & 29–32, Page 3, Lines 1–7 as found in U.S. Pat. application Spec. Ser. No. 328,444, Journal of Neurosurgery, Vol. 30, April 1969, Pages 508–510.

*Primary Examiner*—Aldrich F. Medbery
*Attorney, Agent, or Firm*—Donald D. Mon

[57] ABSTRACT

A clamp for occluding the lumen of a tubular conduit in the human body, such as an artery, a vein, or an intestine. The clamp includes a clamp body, grip means mounted to the clamp body, and a flexible band having an axis of length and of width. The band is attached to the body at a first point along its axis of length, and is gripped by the grip means at a second point along its axis of length. A loop is formed that bounds an opening having an axis, around which axis at least 270° of the peripheral boundary of the opening is formed by the flexible band. In use, the loop is formed around the tubular conduit to be occluded, and the band is drawn tightly against it by shortening the length of the band so that the cross-sectional area of the lumen is gradually closed. The band is preferably stiffly flexible so as to be shape-retaining. A worm screw can be engaged to the band to serve as means for driving the band to lessen the cross-section of the opening.

17 Claims, 9 Drawing Figures

PATENTED OCT 8 1974
3,840,018
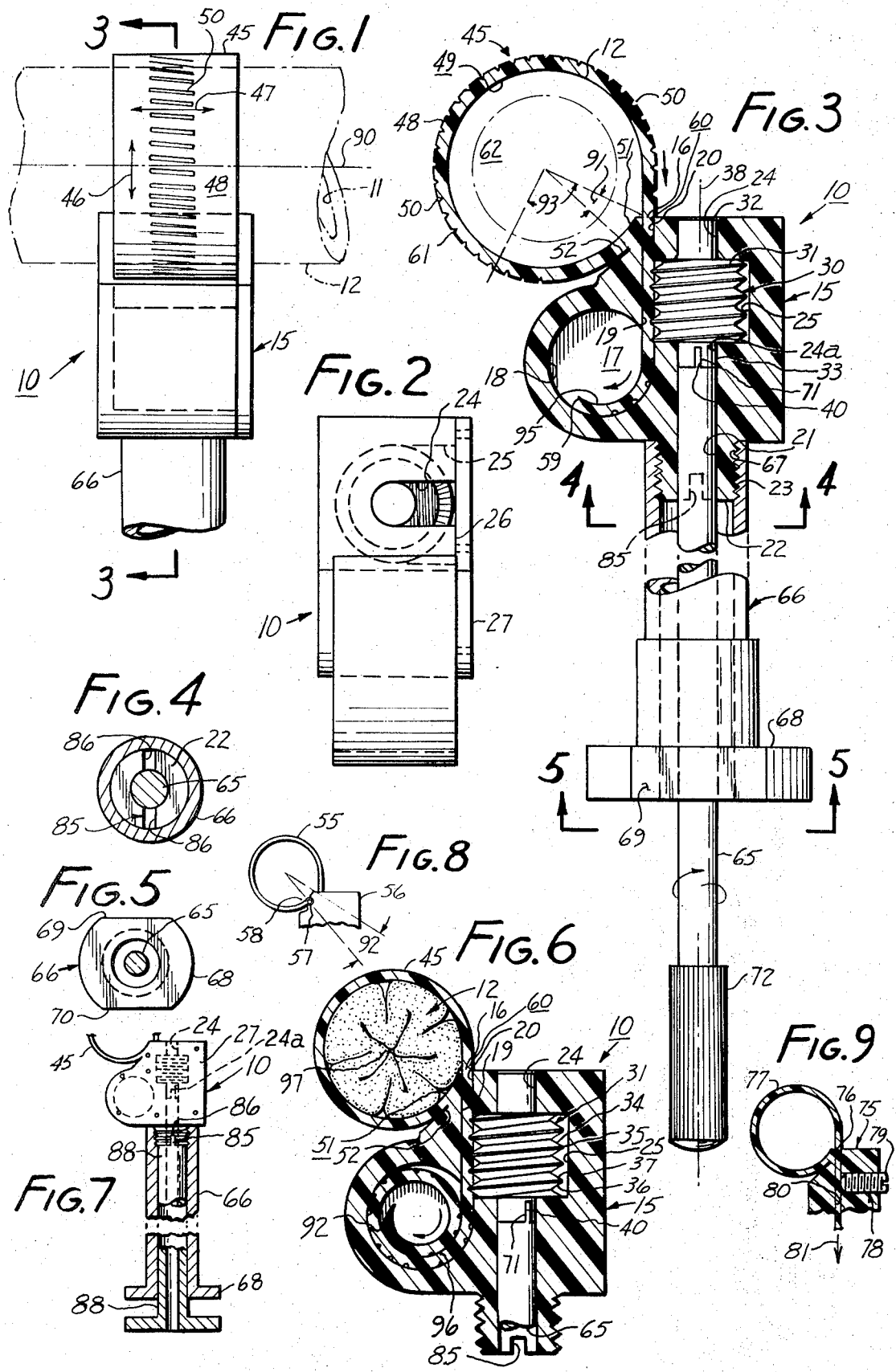

CLAMP FOR OCCLUDING TUBULAR CONDUITS IN THE HUMAN BODY

This invention relates to a clamp for occluding the lumen of a tubular conduit in the human body, such as an artery, a vein, or an intestine.

Requirements exist in surgical procedures for a clamp which can gradually close (occlude) a tubular conduit, such as an artery, a vein, or an intestine. For example, in brain surgery it is sometimes necessary to close the carotid artery. This closure must be accomplished very gradually, for example over a period of a number of days, because it is essential for the brain to form supplementary channels of supply. Sudden closure of the artery may be catastrophic. Clamps which permit sudden closure, or unpredictably rapid reductions of flow, constitute a serious hazard.

There are already-known clamps whose general objective is to close carotid artery, and also other arteries. One commonly known clamp of this type is the Selverstone carotid artery clamp, which is sold by Codman and Shurtleff, Inc., 104 Brookline Avenue, Boston, Massachusetts. Another such clamp is the Salibi carotid artery clamp, which is obtainable from V. Mueller and Company. Still another is the Crutchfield carotid artery clamp, also obtainable from Codman and Shurtleff, Inc. The Crutchfield clamp is fully illustrated in the *Journal of Neurosurgery*, 1959, Vol. XVI, No. 4, at pages 471-474. Yet another is the Kindt carotid artery clamp, obtainable from Gambale & Merrill Corp., Boston, Massachusetts. In the first three of these clamps, the artery is placed between two flat plates which are pressed toward each other to pinch the artery flat so as to close it. The effect is to progressively reduce the lumen to a flat-walled slit, the walls of which finally bear against each other, and the lumen is closed. This construction has the important disadvantage that neither the rate of closure of the lumen nor the rate of reduction of flow is proportional to the rate of rotation of the screw which presses the two plates toward one another. Therefore, the surgeon cannot predict the increment of reduction of flow which an incremental turn of the screw would create. Further, and of even greater importance is the fact that, when the slit is near to closure, but still open to flow, i.e., when the slit is very narrow, the slit construction becomes unstable, and sudden closure can occur with an attendant neurological deficit which can seriously harm the patient.

The Kindt clamp constitutes an attempt to overcome the foregoing disadvantages. Instead of pressing planar plates against the conduit, it presses rigid concave surfaces against it. The effect is to leave the outer wall of the conduit somewhat rounded instead of flat. The objective is to reduce the cross-sectional area as a function of reduction of diameter of the conduit. However, because the plates are rigid, there is a limit on the reduction of diameter, i.e., the curvature of the plates. Especially just before closure, which is a critical event, it will often be found that there is a slit, that the conduit is not round, and that at least some of the problems remain.

It is an object of this invention to provide a device wherein the occlusion of the lumen is gradual and which results from a radial compression exerted by a flexible band which can change its radius of curvature for more than 270° around the periphery of the conduit. As a result, the conduit tends to remain nearly cylindrical, and its outer diameter is incrementally reduced in direct proportion to the reduction of length of the band. As a consequence, there is maintained in the conduit until closure a central opening which has no tendency to form a flat slit from edge to edge. Tests using the clamp of this invention have shown that there is a high degree of linearity in the relationship between the rate of closure, as measured by the turning of a screw, and the reduction of flow rate through the conduit.

A clamp according to this invention includes a clamp body, grip means mounted to the clamp body, and a flexible band attached to the body at a first point along its axis of length and held to the body by the grip means at a second point along its axis of length. A loop is formed with the band such that at least 270° of the peripheral boundary of the opening of the loop is formed by the flexible band, whereby drawing the band past the grip means reduces the length of band between the first and second points, and thereby reduces the peripheral length of the opening, the cross-sectional area of the opening, and the radius of curvature of that portion of the band which bounds the opening. The tubular conduit passes axially through the opening, and fluid flow through its lumen will be reduced when the conduit is embraced by the clamp, and the length of band between the two points is reduced.

According to a preferred but optional feature of the invention, the band is stiffly flexible whereby to form a shape-retaining tubular loop.

According to still another preferred but optional feature of the invention, the clamp body includes an aperture to receive part of the band spaced from the first point, and a chamber to receive and shield that part of the band which has passed through the aperture.

According to still another preferred but optional feature of the invention, the grip means is provided with drive means, which combined means comprises a rotatable worm screw bearing a worm thread which is engageable to the band. Rotation of the worm drives the band through the aperture. The pitch of the worm thread is such that the thread is a "locking thread" which prevents rotation of the worm screw as a consequence of a lengthwise pull on the band.

The above and other features of this invention will be fully understood from the following detailed description and the accompanying drawings in which:

FIG. 1 is a side elevation of the presently preferred embodiment of the invention assembled around a tubular conduit whose lumen is to be occluded;

FIG. 2 is a top view of FIG. 1;

FIG. 3 is a cross-section taken at line 3—3 of FIG. 1;

FIGS. 4 and 5 are cross-sections taken at lines 4—4 and 5—5, respectively, in FIG. 3;

FIG. 6 is a fragmentary cross-section of the device of FIG. 3 in another operating condition;

FIG. 7 is a side elevation, partly in cutaway axial cross-section, showing another step in the utilization of this clamp;

FIG. 8 is a fragmentary side elevation showing an alternate embodiment of the invention; and FIG. 9 is a fragmentary cross-section showing yet another embodiment of the invention.

In FIG. 1, a clamp 10 is shown whose function is to occlude the lumen 11 of a tubular conduit 12 of the class found in the human body. Examples of such conduits are: arteries, for example, the carotid artery; vein, for example, the jugular vein; and the intestine. These are examples of tubular cnduits in the human body which can utilize this invention and do not constitute an exhaustive list. It is the purpose of this invention gradually to reduce the cross-sectional area of the lumen so as to occlude the same gradually and in a manner such that the rate of decrease of flow therethrough is substantially linearly proportional to the rate of reduction of the diameter of a portion of the clamp.

Clamp 10 includes a clamp body 15. The body includes an aperture 16 in the shape of a slit which opens to the outside of the clamp body at one end and which opens into a chamber 17 at its inner end. The chamber has an inner wall 18, at least a fragment of which, and preferably all of which, is a fragment of a cylinder. In the preferred embodiment, the chamber is formed by an inner wall which is entirely cylindrical. The aperture is bounded by a first and a second aperture wall 19, 20, which walls are spaced apart from one another by a distance about equal to the thickness of a band which is yet to be described. Wall 20 intersects wall 18 tangentially. Walls 19 and 20 thereby define tengential entrance aperture 16, and wall 20 (sometimes called a "contiguous wall portion") is contiguous to the entrance aperture. Wall 19 is sometimes called a "grip face," because it backs up the band opposite a grip means.

A shaft passage 21 is formed in the body which terminates at a boss 22. The boss carries an external attachment thread 23. Access slots 24 and 24a are formed in the body. A relief 25 is formed in wall 26 of the clamp body, and slots 24 and 24a intersect the relief and wall 26. A removable cover plate 27 is attached to the clamp body to close the relief.

Combined grip means and drive means 30 is mounted in the relief. This combined means comprises a worm screw 31 having a first and a second stub shaft 32, 33, respectively. Stub shafts 32 and 33 fit in slots 24 and 24a, respectively. The worm screw is dropped into the relief, the stub shafts entering the slots and being embraced by the walls of the access slots. The cover plate holds the worm screw in its illustrated position. The worm screw carries a worm thread 34. This thread has a thread crest 35 defined by thread faces 36, 37, and the thread is sometimes called a "compressive element" in the sense that it holds the band against grip face 19. The thread faces are angulated toward each other at a relatively sharp angle so as to form a thread which can indent a band yet to be described. The screw is rotatable around screw axis 38.

Stub shaft 33 carries a torque-tool engagement means 40 in the form of a driver slot in its lower end. This slot extends transversely relative to axis 38, and axis 38 lies in its plane.

A flexible band 45 has an axis 46 of length and an axis 47 of width. It has an outer surface 48 and an inner surface 49. The inner surface, when formed into the shape shown in FIGS. 3 and 6, is that of a bent plane over a substantial portion of its dimension of width. If desired, serrations or indentations 50 may be formed in the outer surface of the flexible band for engagement by the worm screw. Alternatively, the worm thread may form indentations in the band as it is rotated. The flexible band is attached to the clamp body at a first point 51. In the preferred embodiment of the invention, the band is formed integrally with the clamp body, and a slit 52 divides it from the body, except at the first point so as to form a self-hinge. A similar construction can be made by cementing the band to the clamp body, and a cemented construction will also be referred to as an "integral" construction. The material of the flexible band is stiffly flexible so as to be inherently shape-retaining. Suitable materials are polypropylene, teflon, dacron, nylon, methyl methacrylate and even suitably flexible metals, provided that they can be sterilized and are inert with human tissue. Polypropylene is the preferred material, and a suitable and of it will be approximately ⅜ inch wide and 0.020 inch thick. This is a suitable band for occluding a primary carotid artery. The dimension of length is indefinite and adjustable, as will be seen.

As an alternative to the self-hinge type of attachment, there is shown in FIG. 8 a flexible band 55 attached to a clamp body 56 which, except for the method of attachment of the band to the body, is identical to the clamp body of FIGS. 1 and 3. In the embodiment of FIG. 8, a hinge pin 57, similar to a watchband hinge pin, is utilized to attach the flexible band to the clamp body at a first point 58. No further description will be made of FIG. 8 because, in every respect, its function is the same as that of the device of FIG. 1.

The flexible band is bent so that its free end 59 is passed into aperture 16 past the combined grip means and drive means. Therefore, the band at a second point 60 spaced from the first point along the axis of length is gripped by the grip means, and a loop 61 is formed having an opening 62 within which the tubular conduit 12 is placed when it is to be occluded. This assembly will be made by removing the free end of the flexible band from the clamp body, wrapping the band around the tubular conduit, and then re-introducing the free end into the clamp body to the position shown in FIG. 3.

In order to drive the flexible band, and thereby shorten the distance along the band, i.e., the length of flexible band, between the first and second points, the worm screw is turned in the proper direction. This turning is accomplished by means of a torque-tool 65. As an assistance to the use of the torque-tool, a support tube 66 is provided with an internal attachment thread 67 that is threaded to attachment thread 23 on boss 22. Now, the device can readily be handled, with the clamp body inside the human body, and with the free end of the support tube extending outside the human body. A handle flange 68 is formed on the support tube. It has a pair of flats 69, 70 to facilitate the holding of the assembled clamp and support tube. The torque-tool is passed into the support tube, and it has a blade 71 (FIG. 6) which is engageable with the torque-tool engagement means 40 on the screw slot. A knurled portion 72 on torque-tool 65 provides a better grip for the surgeon.

The worm thread 34 has a locking pitch; that is, pulling on the band in the aperture will not turn the worm screw. Locking threads are well known in the art and have to do with the coefficient of friction of the worm thread and of the band material. When polypropylene is used for the band and stainless steel for the worm screw, a 32 pitch thread, i.e., 32 convolutions per inch of screw has been found to be advantageous and useful.

FIG. 9 shows another embodiment of the invention wherein drive means is not provided, but instead only grip means is provided. In this embodiment, a clamp body 75 is provided with an aperture 76 to receive the free end of flexible band 77, as in the device of FIGS. 3 or 8. Grip means 78 comprises a compressive element such as a set screw 79 which can be brought to bear against the flexible band in the aperture, and press it against grip face 80, so as to grip the flexible band in an adjusted position. An axial pull can be exerted by any desired means, even the hand, as illustrated schematically by arrow 81, so as to adjust the length of the flexible band between its first and second points. FIG. 9 illustrates that grip means need not be combined with drive means, and that means to drive the band need not be incorporated into the clamp.

A convenient means of removing the support tube is shown in FIG. 7, wherein there is illustrated a torque-tool engagement means 85, i.e., a slot in the end of boss 22, which is engageable by a blade 86 on the end of a shaft 88. Shaft 88 may be solid or tubular, as preferred. It is used after the function of the clamp is completed, and the clamp is to be left permanently in place after finally occluding the lumen. At that time, the support tube is to be removed. To remove the support tube, shaft 88 is passed into the support tube 66, and its blades are engaged to slot 85. This will hold the clamp body against rotation, and the support tube can be turned by grasping surfaces 69 and 70 and unthreading the support tube from the boss, leaving the clamp in place. Of course, the support tube can be reattached by a reversal of this procedure.

As shown in FIG. 1, serrations can be formed in the outer surface of the flexible band. Alternatively, the dimensions of the thread may be selected such that it will itself indent the outer surface of the flexible band so as to engage the same and draw it through the aperture when the worm is rotated around axis 38. Then the serrations would not be provided.

Some of the considerations pertinent to this device will now be discussed. The opening 62 has a 360° periphery around opening axis 90. In this device, it is desirable to maximize the extent of the periphery of the opening which is formed by flexible band whose radius of curvature (in the plane of FIG. 3) can be reduced. Because of the need to attach the band to the body, there will always be some portion of the periphery of the opening which will be bounded by rigid clamp body material which will not readily change its radius of curvature, but this will be minimized. For example, angle 91 in FIG. 3 and angle 92 in FIG. 8 represent those portions of the peripheral boundary of the opening which are bounded by something other than the flexible band. As can best be seen in FIG. 3, wherein a 90° angle 93 is shown for reference, at least 270° of the peripheral extent is bounded by the flexible band of material which can change its radius of curvature as the length between the first and second points is shortened. It is desirable in this invention that the lumen not be occluded simply by moving one portion of the tubular conduit toward another portion, either of which is backed up by a rigid object which cannot change its radius of curvature, because this is the problem inherent in the prior art. Accordingly, it will be found that the objectives of this invention will not be achieved should angles 91 or 92 be greater than 90°. It is preferable that they be kept to a size on the order of perhaps 20° or less. All of the periphery of the opening, except for that intercepted by angles 91 and 92, is formed by a flexible portion of the band which can change its radius of curvature. Of course, those portions immediately adjacent to the clamp body itself will be more resistant to change of curvature than those which are spaced farther from it, but when a stiffly flexible material is used for the flexible band, it tends to be shape-retaining and to assume a nearly cylindrical configuration with only small irregularities caused by side support of the aperture walls and by contiguity to the rigid clamp body at the second and first points, respectively. However, these not not materially adversely affect the function of the device.

Reference is again made to chamber 17. The purpose for the tangential entry of the aperture to this chamber is so that the free end of the flexible band will be directed into a curl 95 and ultimately into a helix 96 (see FIG. 6) as the band is drawn into the chamber, thereby shielding the band from the surrounding parts of the human body so that it cannot cut them. The cover plate covers the access slots 24 and 24a, relief 25, and chamber 17.

It will be appreciated from an examination of the drawings, especially by a comparison of FIGS. 3 and 6, that as the length between the first and second points of the flexible band is reduced, substantially all of the periphery of the loop changes its radius, thereby maintaining a substantially cylindrical loop. Accordingly, the diameter of the opening will be reduced in direct relationship to the shortening of the band between the two points. The closure resulting in the lumen will leave a central opening until the end of the closure procedure, and because of the interrelationship of the length of the outer periphery to the flow rate through the tube, there will be a high degree of linearity between the rate of reduction of flow and the rate of reduction of the diameter of the loop. There is no tendency to form a flat slit which becomes unstable toward the end of the closure procedure, and it is likelier that a crenelated construction, such as suggested in FIG. 6, will be created, wherein a small residual passage 97 will remain until very near the end of the closure procedure, contributing to the reliability of this device.

This clamp is simple to manufacture and to use. The surgeon can rely with great confidence upon a reasonably proportional reduction in flow to the rate at which he turns the worm screw. The movement of the flexible band can readily be reversed, because the thread can move the band in either direction by reversing the rotation of the screw so as to reduce or enlarge the opening.

This invention thereby provides an improved clamp for the purposes described which overcomes undesirable features of prior art clamps.

This invention is not to be limited by the embodiments shown in the drawings and described in the description, which are given by way of example and not of limitation, but only in accordance with the scope of the appended claims.

I claim:

1. A clamp for occluding the lumen of a tubular conduit in the human body, such as an artery, a vein, or an intestine, comprising: a clamp body; grip means mounted to the clamp body; and a flexible band having an axis of length and of width, said band being attached to th body at a first point along its axis of length, and being gripped by the grip means at a second point along its axis of length which is spaced from the first point, so as to form a loop that bounds an opening to receive the tubular conduit, said opening having an axis, around which at least 270° of the peripheral boundary of the opening is formed by the flexible band, said grip means having combined therewith drive means for moving the band through the aperture, said combined grip and drive means comprising a rotatable worm screw bearing a worm thread which is engageable with the band, rotation of the worm driving the band through the aperture, the pitch of the worm thread being such as to prevent rotation of the worm screw as the consequence of a lengthwise pull on the band, said clamp body further including a means for receiving and storing an excess portion of said part of the band spaced from said second point in an area removed from said human tubular conduit, comprising a chamber adjacent said gripping means, said chamber having two walls defining a tangential entrance aperture and a contiguous wall portion for forming said excess band portion into a tubular encapsulated curled loop portion.

2. A clamp according to claim 1 in which the boundary wall of the opening is a bent plane.

3. A clamp according to claim 1 in which the band is stiffly flexible, whereby to form a shape-retaining tubular loop.

4. A clamp according to claim 3 in which the boundary wall of the opening is a bent plane.

5. A clamp according to claim 1 in which drive means is mounted to the clamp body to draw the material of the band along its axis of length, thereby to reduce the cross-section of the opening of the loop.

6. A clamp according to claim 1 in which the attachment of the band at the first point is by means of a hinge pin joining the band to the body.

7. A clamp according to claim 6 in which the band is stiffly flexible, whereby to form a shape-retaining tubular loop.

8. A clamp according to claim 1 in which said worm thread is so proportioned relative to the material forming the band as to indent the same to engage the band and draw it through the aperture.

9. A clamp according to claim 1 in which indentations are formed in the band for engagement by the worm thread.

10. A clamp according to claim 1 in which the attachment of the band at the first point is by means of a self-hinge, the flexible band and the body being made as an integral structure.

11. A clamp according to claim 10 in which the band is stiffly flexible, whereby to form a shape-retaining tubular loop.

12. A clamp according to claim 1 in which a support tube is removably attached to said clamp body, said tube having a central passage coaxial with the axis of rotation of the worm screw and giving access to the end of said worm screw, the support tube thereby providing means to support the clamp body at a distance from the clamp body and to give access to the end of the worm screw, also at a distance from the clamp body.

13. A clamp according to claim 12 in which an attachment thread is formed on the clamp body and on the support tube, whereby to provide for their joinder, and in which a torque-tool engagement means is formed on the clamp body at a location accessible through the passage in the support tube when the said attachment threads are engaged to one another, whereby a torque-tool can be engaged to the clamp body to hold it against rotation while the support tube is being unthreaded from the clamp body.

14. A clamp according to claim 13 in which the torque-tool engagement means is a slot.

15. A clamp according to claim 13 in which the band is stiffly flexible, whereby to form a shape-retaining tubular loop.

16. A clamp according to claim 12 in which torque-tool engagement means is provided on the end of the worm screw for engagement by a torque-tool which is inserted into the passage of the support tube.

17. A clamp according to claim 16 in which an attachment thread is formed on the clamp body and on the support tube, whereby to provide for their joinder, and in which a torque-tool engagement means is formed on the clamp body at a location accessible through the passage in the support tube when the said attachment threads are engaged to one another, whereby a torque-tool can be engaged to the clamp body to hold it against rotation while the support tube is being unthreaded from the clamp body.

* * * * *

UNITED STATES PATENT OFFICE
CERTIFICATE OF CORRECTION

PATENT NO. : 3,840,018
DATED : October 8, 1974
INVENTOR(S) : MILTON D. HEIFETZ

It is certified that error appears in the above-identified patent and that said Letters Patent are hereby corrected as shown below:

| | |
|---|---|
| Col. 3, line 1, | "vein" should read --veins-- |
| Col. 3, line 3, | "cnduits" should read --conduits-- |
| Col. 3, line 24, | "tengential" should read --tangential-- |
| Col. 4, line 12, | "and" should read --band-- |
| Col. 6, line 13, | "not not" should read --do not-- |
| Col. 6, line 67, (Cl. 1) | "th" should read --the-- |

Signed and Sealed this twenty-seventh Day of January 1976

[SEAL]

Attest:

RUTH C. MASON
Attesting Officer

C. MARSHALL DANN
Commissioner of Patents and Trademarks